US012072654B2

(12) United States Patent
Hara et al.

(10) Patent No.: US 12,072,654 B2
(45) Date of Patent: Aug. 27, 2024

(54) IMAGE FORMING APPARATUS

(71) Applicant: CANON KABUSHIKI KAISHA, Tokyo (JP)

(72) Inventors: Jun Hara, Kanagawa (JP); Shuichi Tetsuno, Kanagawa (JP); Toshihiko Takayama, Kanagawa (JP); Shinsuke Kobayashi, Kanagawa (JP); Kazuhiro Funatani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/312,990

(22) Filed: May 5, 2023

(65) Prior Publication Data

US 2023/0273562 A1 Aug. 31, 2023

Related U.S. Application Data

(63) Continuation of application No. 17/674,723, filed on Feb. 17, 2022, now Pat. No. 11,669,034.

(30) Foreign Application Priority Data

Feb. 24, 2021 (JP) ................................ 2021-027930
Feb. 3, 2022 (JP) ................................ 2022-015353

(51) Int. Cl.

| | |
|---|---|
| ***G03G 15/16*** | (2006.01) |
| ***G03G 15/00*** | (2006.01) |
| ***G03G 15/06*** | (2006.01) |

(52) U.S. Cl.
CPC ....... *G03G 15/5008* (2013.01); *G03G 15/065* (2013.01); *G03G 15/167* (2013.01)

(58) Field of Classification Search
CPC . G03G 15/065; G03G 15/167; G03G 15/5008
USPC .......................................... 399/66, 149, 150
See application file for complete search history.

(56) References Cited

U.S. PATENT DOCUMENTS

2007/0020005 A1* 1/2007 Shigezaki .......... G03G 21/0017 399/349

FOREIGN PATENT DOCUMENTS

CN 101334616 * 2/2008

* cited by examiner

*Primary Examiner* — Hoan H Tran
(74) *Attorney, Agent, or Firm* — Canon U.S.A., Inc. IP Division

(57) ABSTRACT

A control unit performs control to make a direction of an electric field generated in a first area of an image carrier forming a transfer portion during image forming operation, relative to a voltage applied to a brush member in a state where the first area passes through a contact portion, different from a direction of an electric field generated in a second area of the image carrier forming the contact portion, relative to the voltage applied to the brush member during a period when operation is shifted from first operation in which the image carrier is rotated at a first speed to second operation in which the image carrier is rotated at a second speed different from the first speed, during non-image forming operation different from the image forming operation.

12 Claims, 9 Drawing Sheets

DURING STOP OF DRIVING

AT START OF DRIVING, AT STOP OF DRIVING
(WITHOUT POTENTIAL DIFFERENCE)

AT START OF DRIVING, AT STOP OF DRIVING
(WITH POTENTIAL DIFFERENCE)

FIG.6

| | SECTION | AT START OF DRIVING (C) | SECTION OTHER THAN SECTION WHERE UNTRANSFERRED TONER PASSES THROUGH BRUSH PORTION (B) | SECTION WHERE UNTRANSFERRED TONER PASSES THROUGH BRUSH PORTION (A) | SECTION OTHER THAN SECTION WHERE UNTRANSFERRED TONER PASSES THROUGH BRUSH PORTION (B) | AT STOP OF DRIVING (C) |
|---|---|---|---|---|---|---|
| | RELATIVE ACCELERATION BETWEEN PHOTOSENSITIVE DRUM AND BRUSH MEMBER | PHOTOSENSITIVE DRUM IS POSITIVE RELATIVE TO BRUSH MEMBER | 0 | 0 | 0 | PHOTOSENSITIVE DRUM IS NEGATIVE RELATIVE TO BRUSH MEMBER |
| FIRST COMPARATIVE EXAMPLE | POTENTIAL OF BRUSH MEMBER | -350 V | -350 V | -350 V | -350 V | -350 V |
| | POTENTIAL OF PHOTOSENSITIVE DRUM | 0 V | -100 V | -100 V | -100 V | 0 V |
| | OPERATION | HOLD TONER (+) ACCUMULATING ON BRUSH | ALLOW UNTRANSFERRED TONER (-) TO PASS THOUGH CONTACT PORTION | ALLOW UNTRANSFERRED TONER (-) TO PASS THOUGH CONTACT PORTION | ALLOW UNTRANSFERRED TONER (-) TO PASS THOUGH CONTACT PORTION | HOLD TONER (+) ACCUMULATING ON BRUSH |
| SECOND COMPARATIVE EXAMPLE | POTENTIAL OF BRUSH MEMBER | -350 V | +150 V | -350 V | +150 V | -350 V |
| | POTENTIAL OF PHOTOSENSITIVE DRUM | 0 V | -100 V | -100 V | -100 V | 0 V |
| | OPERATION | HOLD TONER (+) ACCUMULATING ON BRUSH | EJECT TONER (+) ACCUMULATING ON BRUSH | ALLOW UNTRANSFERRED TONER (-) TO PASS THOUGH CONTACT PORTION | EJECT TONER (+) ACCUMULATING ON BRUSH | HOLD TONER (+) ACCUMULATING ON BRUSH |
| FIRST EXEMPLARY EMBODIMENT | POTENTIAL OF BRUSH MEMBER | +150 V | +150 V | -350 V | +150 V | +150 V |
| | POTENTIAL OF PHOTOSENSITIVE DRUM | 0 V | -100 V | -100 V | -100 V | 0 V |
| | OPERATION | EJECT TONER (+) ACCUMULATING ON BRUSH | EJECT TONER (+) ACCUMULATING ON BRUSH | ALLOW UNTRANSFERRED TONER (-) TO PASS THOUGH CONTACT PORTION | EJECT TONER (+) ACCUMULATING ON BRUSH | EJECT TONER (+) ACCUMULATING ON BRUSH |

IMAGE FORMING APPARATUS

CROSS-REFERENCE TO RELATED APPLICATIONS

The present application is a continuation of U.S. patent application Ser. No. 17/674,723, filed on Feb. 17, 2022, which claims priority from Japanese Patent Application No. 2021-027930 filed Feb. 24, 2021 and Japanese Patent Application No. 2022-015353 filed Feb. 3, 2022, which are hereby incorporated by reference herein in their entireties.

BACKGROUND OF THE INVENTION

Field of the Invention

The present disclosure relates to an image forming apparatus, such as a laser printer, a copier, and a facsimile, that uses an electrophotographic system.

Description of the Related Art

An electrophotographic system is known as an image recording system that is used for an image forming apparatus, such as a printer and a copier. The electrophotographic system is a system in which an electrostatic latent image is formed on a photosensitive drum by using a laser beam through an electrophotographic process, and the electrostatic latent image is developed with charged color materials (hereinafter, referred to as toner) to form a developer image. The developer image is then transferred and fixed onto a recording medium to form an image.

A cleanerless system is known in which transfer-residual toner that is not transferred to a sheet and remains on the photosensitive drum is collected by a developing unit without being collected by a cleaning member, and the toner is reused. Japanese Patent Application Laid-Open No. 2007-65580 discusses a cleanerless image forming apparatus. The cleanerless image forming apparatus has a configuration in which a brush member to collect deposits adhering to a photosensitive drum abuts on the photosensitive drum, in place of cleaning of a surface of the photosensitive drum by a cleaning member.

The configuration discussed in Japanese Patent Application Laid-Open No. 2007-65580, however, has the following issues. Toner that has not been used for image formation, such as transfer-residual toner remaining on the surface of the photosensitive drum, accumulates on the brush member abutting on the photosensitive drum. If the toner accumulates on the brush member, the brush member cannot hold the toner, and the toner passing through the brush member adheres to a charging roller. This may cause charging failure to generate a defective image.

SUMMARY OF THE INVENTION

The present disclosure is directed to an image forming apparatus that prevents a defective image by performing control to efficiently eject the toner adhering to the brush member abutting on the photosensitive drum.

According to an aspect of the present invention, an image forming apparatus performing image forming operation to form an image on a transfer-receiving member includes a rotatable image carrier, a charging member configured to charge a surface of the image carrier at a charging portion where the charging member faces the image carrier, an exposure unit configured to expose the surface of the image carrier charged by the charging member to form an electrostatic latent image on the surface of the image carrier, a developing member configured to develop the electrostatic latent image as a developer image by supplying a developer charged to normal polarity to the surface of the image carrier, a transfer member configured to form a transfer portion by coming into contact with the image carrier and to transfer the developer image from the image carrier to the transfer-receiving member at the transfer portion, a brush member configured to form a contact portion on a downstream side of the transfer portion and on an upstream side of the charging portion in a rotation direction of the image carrier and to come into contact with the image carrier at the contact portion, a voltage application unit configured to apply a voltage to the brush member, a driving unit configured to rotationally drive the image carrier, and a control unit configured to control the voltage application unit and the driving unit. After the developer image formed on the surface of the image carrier is transferred to the transfer-receiving member at the transfer portion, the developer remaining on the surface of the image carrier is collected by the developing member. The control unit performs control to make a direction of an electric field generated in a first area of the image carrier forming the transfer portion during the image forming operation, relative to the voltage applied to the brush member in a state where the first area passes through the contact portion, different from a direction of an electric field generated in a second area of the image carrier forming the contact portion, relative to the voltage applied to the brush member during a period when operation is shifted from first operation in which the image carrier is rotated at a first speed to second operation in which the image carrier is rotated at a second speed different from the first speed, during non-image forming operation different from the image forming operation.

Further features of the present invention will become apparent from the following description of exemplary embodiments with reference to the attached drawings.

BRIEF DESCRIPTION OF THE DRAWINGS

FIG. 6 is a diagram illustrating potential relationship in each operation during printing processing according to the first exemplary embodiment.

DESCRIPTION OF THE EMBODIMENTS

Some embodiments of the present disclosure are illustratively described in detail with reference to drawings. However, sizes, materials, shapes, relative arrangements, and the like of components described in the exemplary embodiments should be appropriately changed depending on a configuration of an apparatus to which the disclosure is applied, and various conditions. In other words, the sizes, the materials, the shapes, the relative arrangements, and the like of the components described in the exemplary embodiments do not intend to limit the scope of the present disclosure.

1. Image Forming Apparatus

Figure 1:
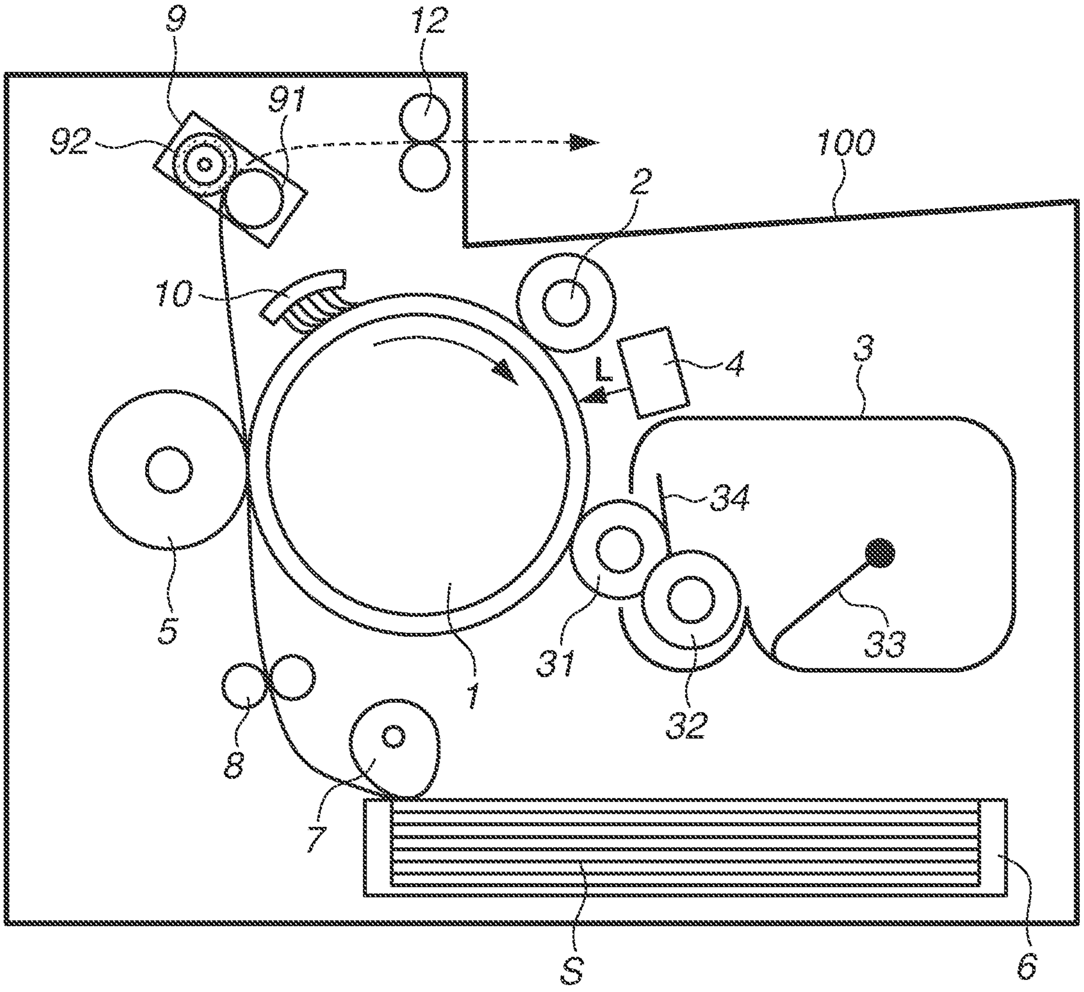
FIG. 1 is a schematic cross-sectional view of an image forming apparatus according to a first exemplary embodiment.

FIG. 1 illustrates a schematic configuration of an image forming apparatus 100 according to a first exemplary embodiment of the present disclosure.

The image forming apparatus 100 according to the first exemplary embodiment is a monochrome laser beam printer adopting a cleanerless system and a contact charging system.

The image forming apparatus 100 according to the first exemplary embodiment includes a cylindrical photosensitive member as an image carrier, namely, a photosensitive drum 1. A charging roller 2 as a charging unit and a developing device 3 as a developing unit are provided on a periphery of the photosensitive drum 1. An exposure means (exposure unit) 4 is provided between the charging roller 2 and the developing device 3 in a rotation direction of the photosensitive drum 1 as illustrated in FIG. 1. A transfer roller 5 as a transfer unit is brought into pressure contact with the photosensitive drum 1.

The photosensitive drum 1 according to the first exemplary embodiment is a negatively charged organic photosensitive member. The photosensitive drum 1 includes a photosensitive layer on a drum-shaped base member made of aluminum, and the photosensitive drum 1 is rotationally driven at a predetermined process speed in an arrow direction (clockwise direction) in the drawing by a driving motor (FIG. 3) as a driving unit 110. In the first exemplary embodiment, the process speed corresponds to a circumferential velocity (surface moving velocity) of the photosensitive drum 1 that is 140 mm/sec, and an outer diameter of the photosensitive drum 1 is 24 mm.

The charging roller 2 as a charging member comes into contact with the photosensitive drum 1 at predetermined pressure-contact force, thereby forming a charging portion. The charging roller 2 receives a desired charging voltage from a charging high-voltage power supply E1 (FIG. 3) as a charging voltage application unit, and uniformly charges a surface of the photosensitive drum 1 to a predetermined potential. In the first exemplary embodiment, the surface of the photosensitive drum 1 is negatively charged by the charging roller 2. In the charging processing, a predetermined charging voltage (charging bias) is applied to the charging roller 2 from the charging power supply E1. In the first exemplary embodiment, in the charging processing, a direct-current voltage of negative polarity is applied as the charging voltage to the charging roller 2. The charging voltage according to the first exemplary embodiment is set to −1300 V (volts) as an example. In the first exemplary embodiment, the surface of the photosensitive drum 1 is thereby uniformly charged with a dark area potential Vd of −700 V. More specifically, the charging roller 2 charges the surface of the photosensitive drum 1 by using discharge generated in at least one of gaps between the charging roller 2 and the photosensitive drum 1 formed on an upstream side and a downstream side of a portion of the charging roller 2 contacting with the photosensitive drum 1 in the rotation direction of the photosensitive drum 1. In this example, however, description is given on the assumption that a portion where the charging roller 2 and the photosensitive drum 1 abut on each other in the rotation direction of the photosensitive drum 1 is a charging portion.

The exposure unit 4 is a laser scanner device in the first exemplary embodiment. The exposure unit 4 outputs a laser beam corresponding to image information input from an external apparatus such as a host computer, thereby scanning and exposing the surface of the photosensitive drum 1. By using such an exposure, an electrostatic latent image (electrostatic image) corresponding to the image information is formed on the surface of the photosensitive drum 1. In the first exemplary embodiment, the dark area potential Vd on the surface of the photosensitive drum 1 formed by uniform charging processing is reduced in absolute value by exposure by the exposure unit 4, and turns into a bright area potential V1 of −100 V. In this example, a position on the photosensitive drum 1 exposed by the exposure unit 4 in the rotation direction of the photosensitive drum 1 is regarded as an exposure portion (exposure position). The exposure unit 4 is not limited to the laser scanner device, and may be, for example, a light-emitting diode (LED) array having a plurality of LEDs arranged along a longitudinal direction of the photosensitive drum 1.

In the first exemplary embodiment, a contact developing system is used as a developing system. The developing device 3 includes a developing roller 31 as a developing member or a developer carrier, a toner supply roller 32 as a developer supply unit, a developer housing chamber 33 for housing the toner, and a developing blade 34. The toner supplied from the developer housing chamber 33 to the developing roller 31 by the toner supply roller 32 is charged to predetermined polarity by passing through a blade nip that is a portion where the developing roller 31 and the developing blade 34 are in contact with each other. The toner carried on the developing roller 31 moves from the developing roller 31 to the photosensitive drum 1 based on the electrostatic image at a developing portion. In this example, a portion where the developing roller 31 and the photosensitive drum 1 are in contact with each other in the rotation direction of the photosensitive drum 1 is regarded as the developing portion. In the first exemplary embodiment, the developing roller 31 is rotationally driven in a counterclockwise direction such that the photosensitive drum 1 and the developing roller 31 move in a forward direction at the developing portion. A driving motor 110 as a driving unit driving the developing roller 31 may be a main motor common to the driving motor 110 for the photosensitive drum 1, or different driving motors may separately rotate the photosensitive drum 1 and the developing roller 31. In development, a predetermined developing voltage (developing bias) is applied to the developing roller 31 from a developing power supply E2 (FIG. 3) as a developing voltage application unit. In the first exemplary embodiment, in the development, a direct-current voltage of negative polarity is applied as the developing voltage to the developing roller 31, and the developing voltage is set to −380 V. In the first exemplary embodiment, the toner charged to the polarity (negative polarity in the first exemplary embodiment) same as the charging polarity of the photosensitive drum 1 adheres to an exposure surface (image portion) that is an image forming portion on the photosensitive drum 1 in which the absolute value of the potential is lowered by exposure after being subjected to the uniform charging processing. Such a developing system is referred to as a reversal developing system. In the first exemplary embodiment, normal polarity that is the charging polarity of the toner in the development is negative polarity. In the first exemplary embodiment, a one-component nonmagnetic contact developing method is adopted. However, the present disclosure is not limited thereto, and a two-component nonmagnetic contact developing method, a non-contact developing method, a magnetic developing method, or other methods may be adopted. The two-component nonmagnetic contact developing method is a method in which a two-component developer containing nonmagnetic toner and magnetic carriers are used as a developer, and the developer (magnetic brush) carried on the developer carrier is brought into contact with the photosensitive drum 1 to perform development. The non-contact developing method is a method in which the toner is caused to fly to the photosensitive member from the developer carrier that is disposed to face the photosensitive member in a non-contact manner. The magnetic developing method is a method in which development is performed while magnetic toner is carried, by magnetic force, on the developer carrier that is disposed to face the photosensitive member in a contact manner or a non-contact manner and incorporates a magnet as a magnetic field generation unit. In the first exemplary embodiment, the toner has a central average particle diameter of 6 μm (micrometers), and the toner's normal charging polarity is negative polarity.

As the transfer roller 5 as the transfer member, a roller including an elastic member, such as a sponge rubber made of, for example, a polyurethane rubber, an ethylene-propylene-diene rubber (EPDM), or a nitrile butadiene rubber (NBR) can be suitably used. The transfer roller 5 is pressed against the photosensitive drum 1, thereby forming a transfer portion where the photosensitive drum 1 and the transfer roller are in pressure contact with each other. At the transfer, a predetermined transfer voltage (transfer bias) is applied to the transfer roller 5 from a transfer power supply E3 (FIG. 3) as a transfer voltage application unit. In the first exemplary embodiment, at the transfer, a direct-current voltage of polarity (positive polarity in the first exemplary embodiment) opposite to the normal polarity of the toner is applied as the transfer voltage to the transfer roller 5. In the first exemplary embodiment, the transfer voltage at the transfer is +1000 V as an example.

By action of an electric field formed between the transfer roller 5 and the photosensitive drum 1, a toner image is electrostatically transferred from the photosensitive drum 1 to a recording medium S.

In synchronization with a timing when the toner image formed on the photosensitive drum 1 reaches the transfer portion, a transfer medium (recording medium) S stored in a cassette 6 is fed by a sheet feeding unit 7 and is conveyed to the transfer portion through a registration roller pair 8. The toner image formed on the photosensitive drum 1 is transferred onto the recording medium S by the transfer roller 5 to which the predetermined transfer voltage from the transfer high-voltage power supply E3 is applied.

The recording medium S onto which the toner image has been transferred is conveyed to a fixer 9. The fixer 9 is a film heating fixer including a fixing film 91 and a pressure roller 92. The fixing film 91 incorporates a fixing heater (not illustrated) and a thermistor (not illustrated) for measuring a temperature of the fixing heater. The pressure roller 92 brings the recording medium S into pressure contact with the fixing film 91. When the recording medium S is heated and pressurized, the toner image is fixed, and the recording medium S is then discharged to outside of the image forming apparatus 100 through a discharge roller pair 12.

Transfer-residual toner remaining on the photosensitive drum 1 without being transferred to the recording medium S is removed in a process described below.

The transfer-residual toner contains a mixture of toner charged to positive polarity and toner charged to negative polarity but not having sufficient charges. The transfer-residual toner is charged to negative polarity again by discharge at the charging portion of the charging roller 2. The transfer-residual toner charged to the negative polarity again by the charging roller 2 reaches the developing portion accompanied by rotation of the photosensitive drum 1. At this time, there are a case where an image-formed portion is formed on the surface of the photosensitive drum 1 having reached the developing portion and a case where a non-image-formed portion is formed on the surface of the photosensitive drum 1 having reached the developing portion. The image-formed portion is a portion where an electrostatic latent image is formed, and the non-image-formed portion is a portion where no electrostatic latent image is formed. Behavior of the transfer-residual toner having reached the developing portion in a case of the image-formed portion of the photosensitive drum 1 and in a case of the non-image-formed portion of the photosensitive drum 1 will be separately described.

The transfer-residual toner adhering to the image-formed portion of the photosensitive drum 1 is not transferred from the photosensitive drum 1 to the developing roller 31 at the developing portion. The transfer-residual toner moves with the developed toner from the developing roller 31 to the transfer portion, and is transferred to the recording medium S to form an image.

In contrast, the transfer-residual toner adhering to the non-image-formed portion of the photosensitive drum 1 is again charged to the negative polarity, which is the normal polarity, by the charging portion. The transfer-residual toner is then transferred, at the developing portion, to the developing roller 31 by a potential difference between a potential at the non-image-formed portion of the photosensitive drum 1 and the developing voltage, and is collected to the developer housing chamber 33. The toner collected to the developer housing chamber 33 is again used for image formation.

2. Configuration of Brush Member

A paper-dust removal mechanism according to the first exemplary embodiment will now be described. As illustrated in FIG. 1, the image forming apparatus 100 according to the first exemplary embodiment includes a brush member 10 (collection member) that is a contact member as the paper-dust removal mechanism. In the first exemplary embodiment, the image forming apparatus 100 includes the brush member 10 that comes into contact with the surface of the photosensitive drum 1 on a downstream side of the transfer portion and on an upstream side of the charging portion in the rotation direction of the photosensitive drum 1, to form a brush contact portion (brush contact position). In this example, a portion where the brush member 10 and the photosensitive drum 1 come into contact with each other in the rotation direction of the photosensitive drum 1 is regarded as the brush contact portion (hereinafter, referred to as contact portion).

Figures 2A, 2B:
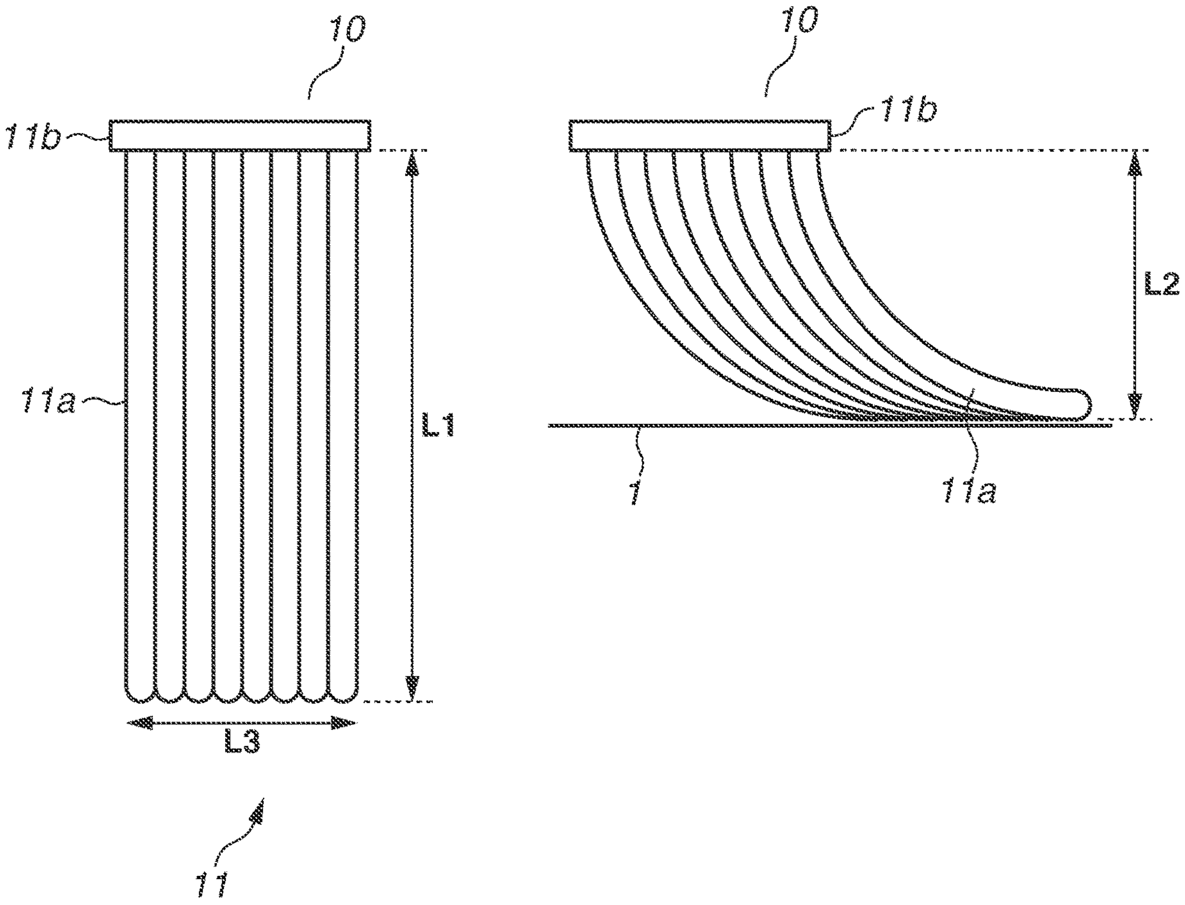
FIGS. 2A and 2B are schematic diagrams of a brush member according to the first exemplary embodiment.

FIG. 2A is a schematic diagram illustrating the single brush member 10 as viewed along a longitudinal direction thereof (substantially parallel to rotation axis direction of photosensitive drum 1). FIG. 2B is a schematic diagram illustrating the brush member 10 abutting on the photosensitive drum 1, as viewed along the longitudinal direction thereof.

A brush portion of the brush member 10 includes a conductive fixed brush 11 fixed and disposed. As illustrated in FIGS. 2A and 2B, the brush member 10 includes pile yarns 11*a* and a base fabric 11*b*. The pile yarns 11*a* are made of conductive nylon 6 and are bristle materials brushing the surface of the photosensitive drum 1. The base fabric 11*b* supports the pile yarns 11*a*. As described above, the brush member 10 is disposed so as to come into contact with the photosensitive drum 1 on the downstream side of the transfer portion and on the upstream side of the charging portion in the moving direction (rotation direction) of the photosensitive drum 1.

The brush member 10 is disposed such that the longitudinal direction thereof is substantially parallel to the rotation axis direction of the photosensitive drum 1. Examples of the material of the conductive yarns 11*a* include rayon, acrylic, and polyester in addition to nylon.

As illustrated in FIG. 2A, in a state of the single brush member 10, namely, in a state where force bending the conductive yarns 11*a* is not applied from outside, a distance from the base fabric 11*b* to front ends of the conductive yarns 11*a* extending from the base fabric 11*b* is denoted by L1. In the first exemplary embodiment, the distance L1 is 6.5 mm. The brush member 10 is disposed such that the base fabric 11*b* is fixed, by a fixing member such as a double-sided tape, to a supporting member (not illustrated) disposed at a predetermined position of the image forming apparatus 100, and the front ends of the conductive yarns 11*a* make inroads into the photosensitive drum 1. In the first exemplary embodiment, a clearance between the above-described supporting member and the photosensitive drum 1 is fixed. A shortest distance from the base fabric 11*b* of the brush member 10 fixed to the above-described supporting member to the photosensitive drum 1 is denoted by L2. In the first exemplary embodiment, a difference between the shortest distance L2 and the distance L1 is defined as an inroad amount of the brush member 10 to the photosensitive drum 1. In the first exemplary embodiment, the inroad amount of the brush member 10 to the photosensitive drum 1 is 1 mm. Further, in the first exemplary embodiment, as illustrated in FIG. 2A, in the state of the single brush member 10, a length L3 of the brush member 10 in a circumferential direction (hereinafter, referred to as transverse direction) of the photosensitive drum 1 is 5 mm. Further, in the first exemplary embodiment, a length of the brush member 10 in the longitudinal direction is 216 mm. The brush member 10 can thereby come into contact with the whole of an image formation area (area where toner image may be formed) on the photosensitive drum 1 in the rotation axis direction of the photosensitive drum 1. In the first exemplary embodiment, a thickness of each of the conductive yarns 11*a* is 2 deniers, and density of the conductive yarns 11*a* is 240 kF/inch$^2$ (kF/inch$^2$ is a unit of brush density and indicates number of filaments per square inch). As described above, the brush member 10 is supported by the supporting member (not illustrated), is disposed at the fixed position relative to the photosensitive drum 1, and the brush member 10 brushes the surface of the photosensitive drum 1 with movement of the photosensitive drum 1.

The brush member 10 catches (collects) deposits, such as paper dust, transferred from the recording medium S onto the photosensitive drum 1 at the transfer portion, thereby reducing an amount of paper dust moving to the charging portion and the developing portion on the downstream side of the brush member 10 in the moving direction of the photosensitive drum 1.

In the first exemplary embodiment, the length of the brush member 10 in the circumferential direction (hereinafter, transverse direction) of the photosensitive drum 1 is set to 5 mm; however, the length L3 is not limited thereto. For example, the length L3 may be appropriately changed depending on a lifetime of the image forming apparatus or a process cartridge. The brush member 10 can catch paper dust for a longer time as the length of the brush member 10 in the transverse direction is longer as a matter of course.

In the first exemplary embodiment, the length of the brush member 10 in the longitudinal direction is set to 216 mm; however, the length is not limited thereto. For example, the length may be appropriately changed depending on the maximum sheet-passing width of the image forming apparatus 100.

In the first exemplary embodiment, a fineness of the brush member 10 is 220 T/96F (means bundle of 96 yarns each having thickness of 220 grams per 10000 meters); however, the fineness of the brush member 10 is desirably determined in consideration of slipping-through property of the paper dust. When the fineness of the brush member 10 is small, strength to stem the paper dust is weak, and the paper dust easily slips through the brush member 10. This inhibits charging of the photosensitive drum 1 by the charging roller 2, which may cause a defective image. In contrast, when the fineness of the brush member 10 is excessively large, the brush member 10 cannot collect the toner and fine paper dust. As a result, density unevenness may occur due to adhesion unevenness of the toner in the longitudinal direction of the charging roller 2, or a defective image may occur due to charging failure at a portion where the paper dust adheres.

In the first exemplary embodiment, the density of the brush member 10 is 240 kF/inch$^2$; however, the density is desirably determined in consideration of permeability of the toner and paper dust catching performance. More specifically, when the density of the brush member 10 is large, permeability of the toner is deteriorated and the toner may be stacked (solidified). The stacked toner may be scattered to cause a defect such as contamination in the image forming apparatus. In contrast, when the density of the brush member 10 is small, the paper dust catching performance is weakened.

The thickness and the density of the conductive yarns 11*a* are preferably 1 to 6 deniers and 150 to 350 kF/inch$^2$, respectively, in terms of paper dust catching performance. The length of the brush member 10 in the transverse direction is preferably 3 mm or more in terms of a long lifetime.

A brush power supply E4 (FIG. 3) as a brush voltage application unit is connected to the brush member 10. During image formation, a predetermined brush voltage (brush bias) is applied to the brush member 10 from the brush power supply E4. In the first exemplary embodiment, during the image formation, a direct-current voltage of negative polarity is applied as the brush voltage to the brush member 10. In the first exemplary embodiment, the brush voltage during the image formation is −350 V as an example.

3. Image Output Operation

In the first exemplary embodiment, the image forming apparatus 100 performs image output operation (job) that is a series of operation to form an image on one or a plurality of recording media S in response to one start instruction from an external apparatus (not illustrated) such as a personal computer. The job typically includes an image forming process (printing process), a pre-rotation process, a sheet interval process in a case where an image is formed on a plurality of recording media S, and a post-rotation process. The image forming process is a period when formation of the electrostatic image on the photosensitive drum 1, development of the electrostatic image (formation of toner image), transfer of the toner image, fix of the toner image, and the like are actually performed. The term "During image formation" indicates this period. More specifically, the timing of the image forming process varies depending on a position where formation of the electrostatic image, formation of the toner image, transfer of the toner image, fix of the toner image, or the like is performed. The pre-rotation process is a period when preparation operation before the image forming process is performed. The sheet interval process is a period corresponding to an interval between a recording medium S and a subsequent recording medium S when the image forming process is continuously performed on the plurality of recording medium S (during continuous image formation). The post-rotation process is a period when an arrangement operation (preparation operation) after the image forming process is performed. The term "During non-image formation" indicates a period other than "during image formation", and includes the pre-rotation process, the sheet interval process, and the post-rotation process, and further includes a pre-multi-rotation process. The pre-multi-rotation process is preparation operation performed when the image forming apparatus 100 is turned on or is returned from a sleep state.

4. Control Mode

Figure 3:
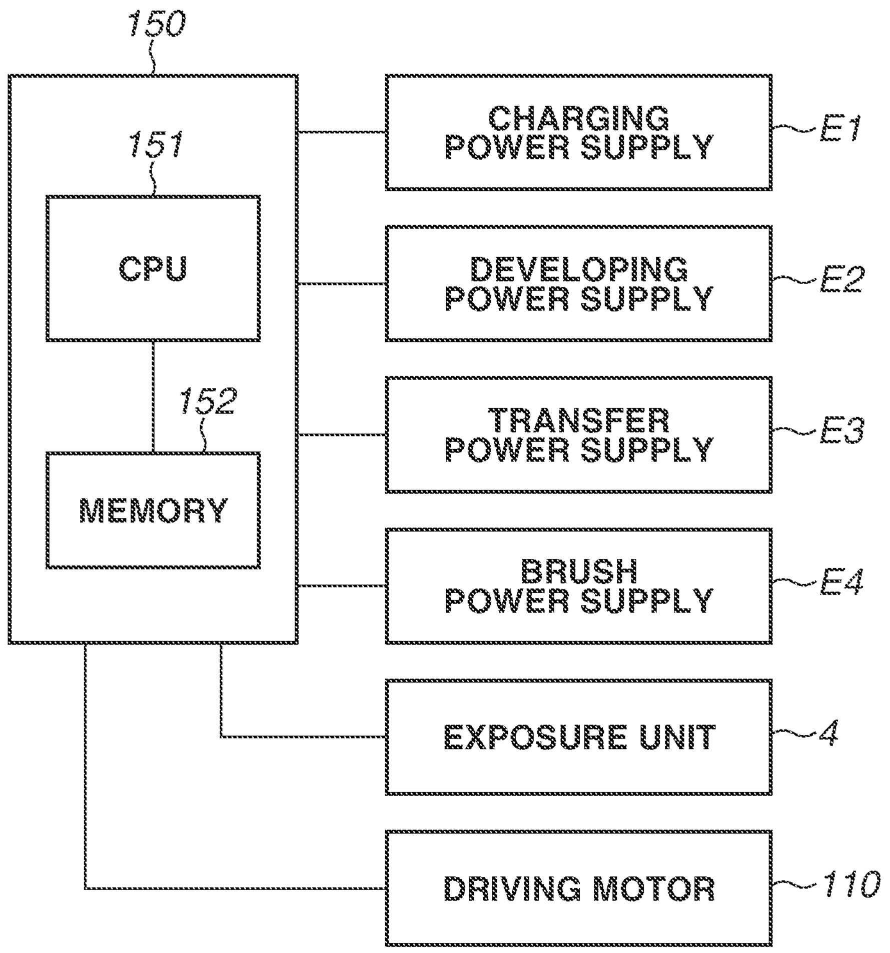
FIG. 3 is a control block diagram according to the first exemplary embodiment.

FIG. 3 is a schematic block diagram illustrating a control mode of main units of the image forming apparatus 100 according to the first exemplary embodiment. The image forming apparatus 100 includes a control unit 150. The control unit 150 includes a central processing unit (CPU) 151 as a calculation control unit that is a central device performing calculation processing, a memory (storage device) 152 as a storage unit such as a read only memory (ROM) and a random access memory (RAM), and an input/output unit (not illustrated) controlling transmission/reception of signals with various kinds of elements connected to the control unit 150. The RAM stores, for example, a detection result of a sensor, and a calculation result, and the ROM stores, for example, control programs, and a predetermined data table.

The control unit 150 totally controls operation of the image forming apparatus 100. The control unit 150 controls, for example, transmission/reception of various kinds of electric information signals and a driving timing to perform a predetermined image forming sequence. The control unit 150 is connected to units of the image forming apparatus 100. In the first exemplary embodiment, examples of the units connected to the control unit 150 include the charging power supply E1, the developing power supply E2, the transfer power supply E3, the brush power supply E4, the exposure unit 4, and the driving motor 110.

5. Behavior of Toner to Brush Member

Next, behavior of the transfer-residual toner passing through the brush member 10 is described with reference to FIGS. 4A and 4B. First, relationship will be described of the potential difference between the potential of the brush member 10 and the surface potential of the photosensitive drum 1 at the contact portion, with the polarity of the transfer-residual toner.

Figure 4A:
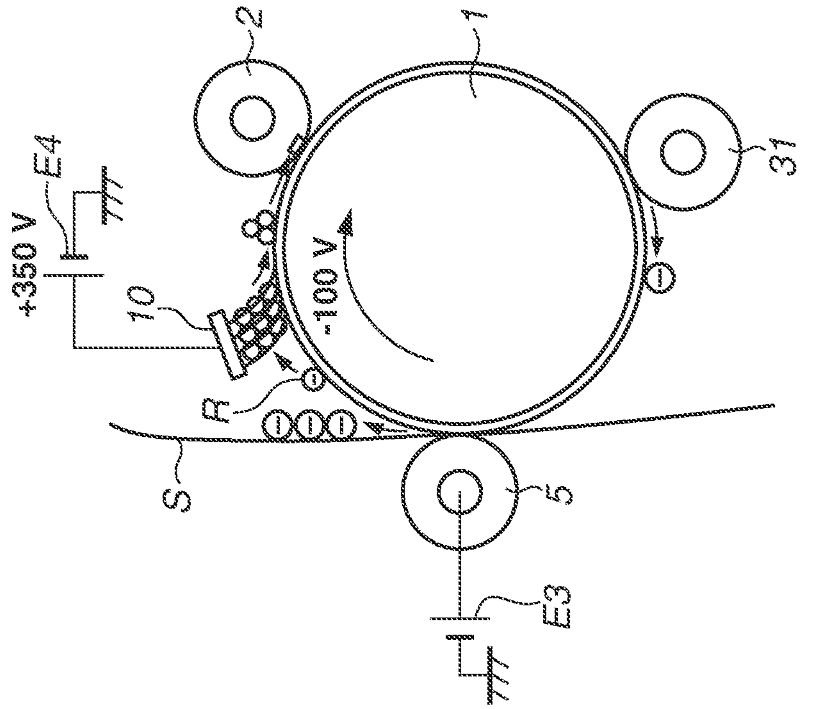
FIGS. 4A and 4B are diagrams illustrating movement of toner passing through the brush member according to the first exemplary embodiment.
Figure 4B:
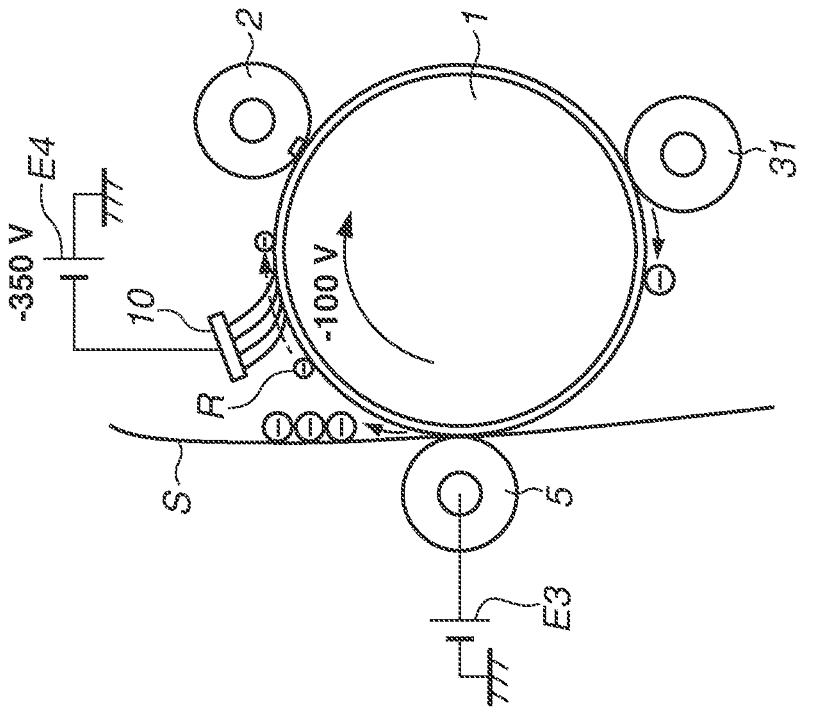

As illustrated in FIG. 4A, in a case where a percentage of toner R charged to the normal polarity (hereinafter, referred to as normal polarity toner) is high in the transfer-residual toner and in a case of potential relationship where an electric field in a direction in which the normal polarity toner R adheres to the brush member 10 is generated, the toner continuously accumulates on the brush member 10. In contrast, as illustrated in FIG. 4B, in the case where the percentage of the toner R is high in the transfer-residual toner and in a case of potential relationship where an electric field in a direction in which the normal polarity toner R does not adhere to the brush member 10 is generated, the normal polarity toner R passes through the brush member 10 without being held by the brush member 10. The case where the electric field in the direction in which the normal polarity toner R does not adhere to the brush member 10 is generated indicates a case of potential relationship where an electric field in a direction in which the normal polarity toner R moves to the photosensitive drum 1 is generated. In this case, the normal polarity toner R passes through the contact portion. Under the relationship, even when the polarity of the toner is reversed, the polarity of the potential difference in the above description is only reversed and phenomenon similar to the above-described phenomenon occurs. In the first exemplary embodiment, control will be described in the case where the percentage of the normal polarity toner R in the transfer-residual toner is high as described below; however, the control is suitably applicable to a case where a percentage of toner charged to opposite polarity (hereinafter, referred to as reverse polarity toner) is high.

As in the first exemplary embodiment, the percentage of the toner charged to the normal polarity in the transfer-residual toner tends to be increased, under a condition where the polarity is hardly reversed, for example, the transfer bias applied to the transfer portion is relatively low. In contrast, the percentage of the reverse polarity toner in the transfer-residual toner tends to be increased, under a condition where the polarity is easily reversed, for example, the transfer bias is high.

In the first exemplary embodiment, most of the transfer-residual toner is the normal polarity toner having charges weak in negative polarity i.e., the normal polarity; however, the reverse polarity toner having positive charges is partially mixed due to discharge between the transfer bias and the surface potential of the photosensitive drum 1 at the transfer portion. Behavior will now be described of the normal polarity toner and the reverse polarity toner of the transfer-residual toner remaining on the surface of the photosensitive drum 1 at the contact portion.

During the image formation, the surface of the photosensitive drum 1 is charged to have the dark area potential Vd of −700 V.

The image-formed portion on the photosensitive drum 1 is exposed by the exposure unit 4 to have the bright area potential V1 of −100 V. The non-image-formed portion on the photosensitive drum 1 is also charged to about −100 V due to discharge between the photosensitive drum 1 and the transfer roller 5 to which the transfer voltage of +1000 V is applied, by passing through the transfer portion. The surface potential of the photosensitive drum 1 reaching the contact portion during the image formation is about −100 V, accordingly. In the transfer-residual toner, the normal polarity toner charged to the negative polarity passes through the contact portion while being electrostatically attracted to the photosensitive drum 1 by the potential difference between the brush voltage (−350 V) and the surface potential (about −100 V) of the photosensitive drum 1 at the contact portion. In contrast, in the transfer-residual toner, the reverse polarity toner charged to the positive polarity is electrostatically attracted to the brush member 10 by the potential difference between the brush voltage (−350 V) and the surface potential (about −100 V) of the photosensitive drum 1 after transfer at the contact portion, and adheres to the brush member 10.

The negative polarity toner having passed through the charging portion is sent to the developing portion accompanied by rotation of the photosensitive drum 1. In the non-image-formed portion, the negative polarity toner sent to the developing portion moves to the developing roller 31 by the potential difference between the dark area potential (Vd) on the surface of the photosensitive drum 1 and the developing bias (Vdc), and is collected to the developing device 3. In contrast, in the image-formed portion, the negative polarity toner sent to the developing portion does not move to the developing roller 31 by the potential difference between the bright area potential (V1) on the surface of the photosensitive drum 1 and the developing bias (Vdc). The toner is sent as is as the toner for the image-formed portion to the transfer portion accompanied by rotation of the photosensitive drum 1, and is transferred to the recording medium S. As described above, the developing bias is set to a potential between the dark area potential Vd and the bright area potential V1.

The image forming apparatus 100 may further include a pre-exposure device as a charge elimination unit for eliminating charges on the surface of the photosensitive drum 1 on the downstream side of the transfer portion and on the upstream side of the charging portion in the rotation direction of the photosensitive drum 1. The pre-exposure device optically eliminates the surface potential of the photosensitive drum 1 before a target portion of the photosensitive drum 1 enters the charging portion, in order to generate stable discharge at the charging portion. The charge elimination includes removal (attenuation) of at least a part of charges. In this example, a position exposed (subjected to charge removing processing) by the pre-exposure device in the rotation direction of the photosensitive drum 1 is a charge elimination portion. It is desirable to perform the charge elimination processing on the surface of the photosensitive drum 1 on the downstream side of the contact portion and on the upstream side of the charging portion in the rotation direction of the photosensitive drum 1 such that the toner having passed through the contact portion passes through the charge elimination portion and is stably charged to the negative polarity by uniform discharge at the charging portion.

Influence on the image by accumulation of the toner on the brush member 10 will now be described with reference to Table 1. In image evaluation, Office70 (trade name, manufactured by Canon Inc.) was used as the recording medium S, and an entire surface halftone image was printed on 100 sheets. To examine an amount of toner accumulating on the brush member 10, occurrence of a defective image was checked. The defective image specifically indicates charging failure occurring by slipping-through of the toner caused by accumulation of the toner on the brush member 10 or developing failure by slipping-through of the paper dust. The charging failure is caused by, for example, the toner slipping through the brush member 10 and adhering to the charging roller 2. The developing failure is caused by, for example, thin density, and occurrence of a streaky image. The thin density occurs when the paper dust slipping through the brush member 10 is collected to the developing device 3 and the paper dust inhibits charging of the toner. The streaky image occurs when the paper dust adheres to the developing blade.

As illustrated in Table 1, in a case where the normal polarity toner accounts for the majority of the transfer-residual toner as in the first exemplary embodiment, a defective image did not occur under the potential relationship where the transfer-residual toner passes through the contact portion, namely, in the state where the brush voltage is on the negative polarity side relative to the surface potential of the photosensitive drum 1. In contrast, a defective image occurred under the potential relationship where the normal polarity toner adheres to the brush member 10, namely, in the case where the brush voltage is on the positive polarity side relative to the surface potential of the photosensitive drum 1.

TABLE 1

| Surface Potential of Photosensitive Drum at Contact Portion | Brush Voltage | Occurrence of Defective Image |
|---|---|---|
| −100 V | +350 V | NG |
| −100 V | −350 V | OK |

Based on the above-described results, control is performed, during the image formation, to realize the potential relationship where the transfer-residual toner passes through the contact portion without adhering to the brush member 10 in an area where the transfer-residual toner passes through the contact portion on the photosensitive drum 1 contacting with the brush member 10, in the first exemplary embodiment. This can prevent occurrence of a defective image caused by excess accumulation of the toner on the brush member 10.

6. Toner Ejection Control from Brush Member

As described above, the transfer-residual toner contains both the normal polarity toner and the reverse polarity toner that is charged to polarity opposite to the normal polarity. The reverse polarity toner may thereby accumulate on the brush member 10 even in a case where the potential relationship where the normal polarity toner passes through the contact portion is formed in the contact portion, with respect to the transfer-residual toner high in percentage of the normal polarity toner. Thus, it is necessary to periodically transfer (eject) the toner adhering to the brush member 10 to the photosensitive drum 1 at an appropriate timing.

As a method of ejecting the toner from the brush member 10 to the surface of the photosensitive drum 1, a method using a potential difference and a method using posture change of the brush member 10 are adoptable. The method using the potential difference makes it possible to eject the toner from the brush member 10 by realizing the potential relationship where the electric field in the direction in which the toner moves from the brush member 10 to the photosensitive drum 1 is generated, with respect to the polarity of the main toner held by the brush member 10. This is regarded as a method using electric force.

Figure 5A:
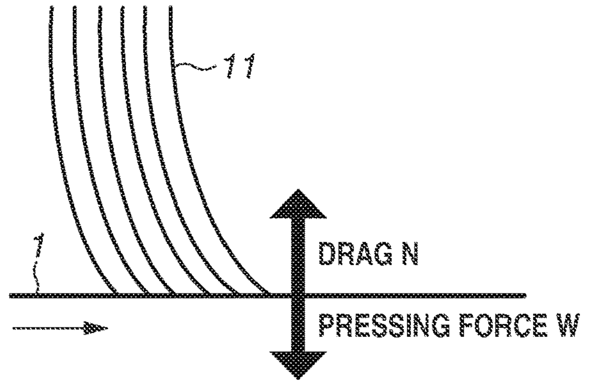
FIGS. 5A to 5C are diagrams illustrating force applied to the brush member according to the first exemplary embodiment.
Figure 5B:
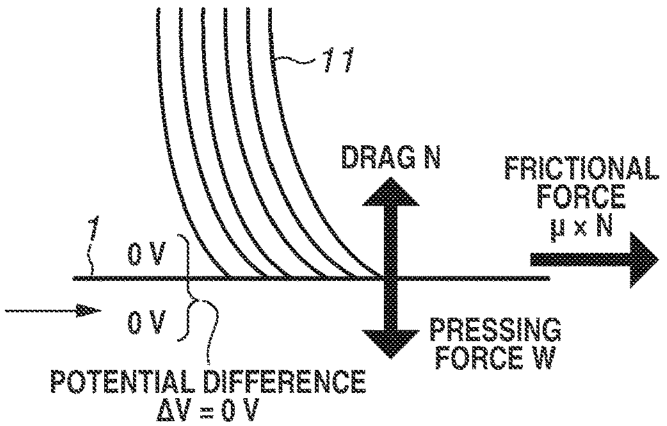

In contrast, the method using posture change of the brush member 10 is a method using physical force. More specifically, this is a method to remove the toner adhering to the brush member 10 by intentionally causing posture change of the brush member 10 at a timing when a speed of the photosensitive drum 1 is varied, for example, at driving start or driving stop of the photosensitive drum 1. During stop of driving, force in the rotation direction of the photosensitive drum 1 is not applied to the brush member 10, as illustrated in FIG. 5A, and the brush member 10 only receives reaction force from the photosensitive drum 1. The brush member 10 thus takes a posture substantially perpendicular to the photosensitive drum 1. When driving of the photosensitive drum 1 is started in a state where there is no potential difference between the brush member 10 and the photosensitive drum 1, the brush member 10 receives static frictional force μN (where μ is a static friction coefficient, and N is perpendicular drag), in the rotation direction of the photosensitive drum 1, as illustrated in FIG. 5B, and takes a posture falling toward the downstream in the rotation direction of the photosensitive drum 1. The posture of the brush member 10 during stop of driving thus changes from the posture of the brush member 10 during rotational driving. Even in a case where operation is shifted from the rotational driving to stop of driving, a phenomenon in which the posture is changed from the posture illustrated in FIG. 5B to the posture illustrated in FIG. 5A similarly occurs. Using the posture change makes it possible to eject the toner that is hardly ejected only by using electric force, such as potential difference. However, the surface of the photosensitive drum 1 is smooth in most cases and the static friction coefficientμ is small, and thus the move of the brush member 10 is small only by using the drive and stop of rotation of the photosensitive drum 1. An amount of the movement of the front end of the brush member 10 is approximately 100 μm, according to the present exemplary embodiment.

Figure 5C:
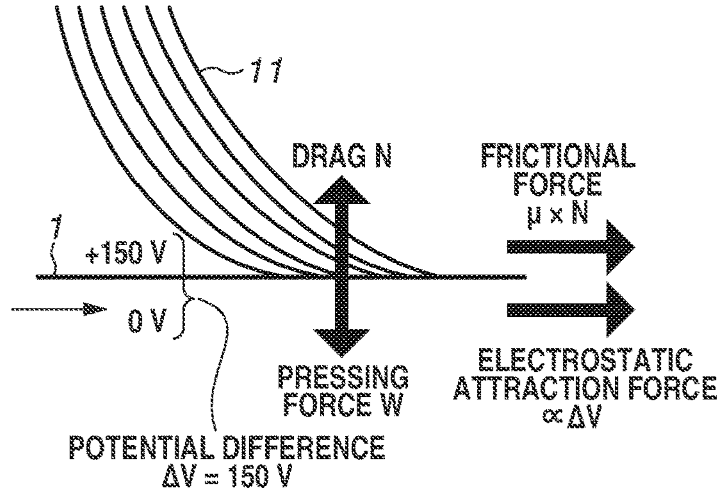

When the photosensitive drum 1 is driven in a state where there is potential difference between the brush member 10 and the photosensitive drum 1, the brush member 10 receives electrostatic attraction force, which is proportional to potential difference ΔV, between the brush member 10 and the photosensitive drum 1, in addition to electrostatic force μN. The brush member 10 thus takes a posture falling more toward the downstream in the rotation direction of the photosensitive drum 1 than the posture in the case where there is no potential difference, as illustrated in FIG. 5C. Thus, the posture changes much if there is potential difference between the brush member 10 and the photosensitive drum 1 during stop of driving and rotational driving. In the present exemplary embodiment, the front end of the brush member 10 moved approximately 1 mm, and the ejection amount of toner increased. Even in a case where operation is shifted from the rotational driving to stop of driving, a phenomenon similarly occurs in which the posture changes from the posture illustrated in FIG. 5C to the posture illustrated in the FIG. 5A. Using the posture change makes it possible to effectively eject the toner that is hardly ejected only by using the static friction force, with respect to the toner accumulating on a root part of the brush member 10 far from the photosensitive drum 1.

Confirmation of an effect of toner ejection from the brush member 10 will now be described. To confirm the effect of the toner ejection, Office70 (trade name, manufactured by Canon Inc.) was used as the recording medium S, and one-sheet intermittent printing operation of an entire surface halftone image was repeated by the image forming apparatus 100. The image was printed on 500 sheets in total, and occurrence of a defective image was checked. An ejection amount by the method using the potential difference and an ejection amount by the method using the posture change of the brush member 10 were checked by sticking a translucent polyester tape (manufactured by Nichiban Co., Ltd.) to a measurement target portion on the photosensitive drum 1. More specifically, the toner ejected to the surface of the photosensitive drum 1 was transferred to the tape, and the toner was quantified at density when the removed tape was stuck to a pasteboard. Density of a tape directly stuck to the pasteboard without being stuck to the photosensitive drum 1 and density of the tape stuck to the pasteboard after being stuck to the measurement target portion were measured by a reflective densitometer (TC-6MC-D, manufactured by Tokyo Denshoku Co., Ltd.), and a difference between measured values was recorded as density. Thus, a high density value indicates that an amount of ejected toner is large.

FIG. 6 illustrates potential relationship in a first comparative example, a second comparative example, and the first exemplary embodiment. In the first comparative example, the potential relationship between the brush member 10 and the photosensitive drum 1 is not changed, and ejection of the reverse polarity toner accumulating on the brush member 10 is not actively performed during a period from start of driving to stop of the driving. In other words, in the first comparative example, the potential relationship between the brush member 10 and the photosensitive drum 1 is the potential relationship where the normal polarity toner constantly passes through the contact portion.

In the second comparative example, the potential relationship between the brush member 10 and the photosensitive drum 1 is set to the following relationship. The potential relationship in a section where the transfer-residual toner passes through the contact portion during the image formation is reversed from the potential relationship in other section, namely, a section where the transfer-residual toner passes through the transfer portion of the photosensitive drum 1 and then passes through the contact portion during the non-image formation. In other words, in the second comparative example, the potential relationship is set to the potential relationship where the normal polarity toner accumulating on the brush member 10 passes through the contact portion in the section where the transfer-residual toner passes through the contact portion, and the potential relationship is set to the potential relationship where the normal polarity toner adheres to the photosensitive drum 1 during the non-image formation. In other words, in the second comparative example, the potential relationship is set to the potential relationship where the reverse polarity toner is ejected to the surface of the photosensitive drum 1. In the second comparative example, however, a timing when the potential relationship is reversed from the potential relationship of the section where the transfer-residual toner passes through the contact portion excludes the time of driving start and the time of driving stop. In other words, the time when the reverse polarity toner is electrically ejected at the contact portion is not present in the first comparative example, whereas the time when the reverse polarity toner is electrically ejected at the contact portion is present in the second comparative example. Further, in both the first comparative example and the second comparative example, the potential relationship where the reverse polarity toner is electrically ejected at the contact portion is not realized at the time of rotation driving and at stop of rotation driving when the physical ejection occurs. Thus, electric ejection of the reverse polarity toner is not considered at the timing when the speed of the photosensitive drum 1 is switched in the first comparative example and the second comparative example. In the second comparative example, ejection is considered only when the photosensitive drum 1 rotates at an equal speed.

In contrast, the positional relationship between the brush member 10 and the photosensitive drum 1 at start of driving and at stop of driving is reversed from the potential relationship during the image formation, in the first exemplary embodiment in addition to the condition of the second comparative example. The reverse polarity toner accumulating on the brush member 10 in the section where the transfer-residual toner passes through the contact portion is thereby ejected to the photosensitive drum 1 at start of driving and at stop of driving. At this time, the brush voltage to be applied is set to +150 V.

In the first comparative example, the second comparative example, and the first exemplary embodiment, the confirmation of the effect of the toner ejection was performed in a case where the transfer voltage was adjusted and the percentage of the normal polarity toner was high in the transfer-residual toner. The potential relationship between the brush member 10 and the photosensitive drum 1 in the section where the transfer-residual toner passes through the contact portion was set to the potential relationship where the normal polarity toner passed through the contact portion.

Figure 7:
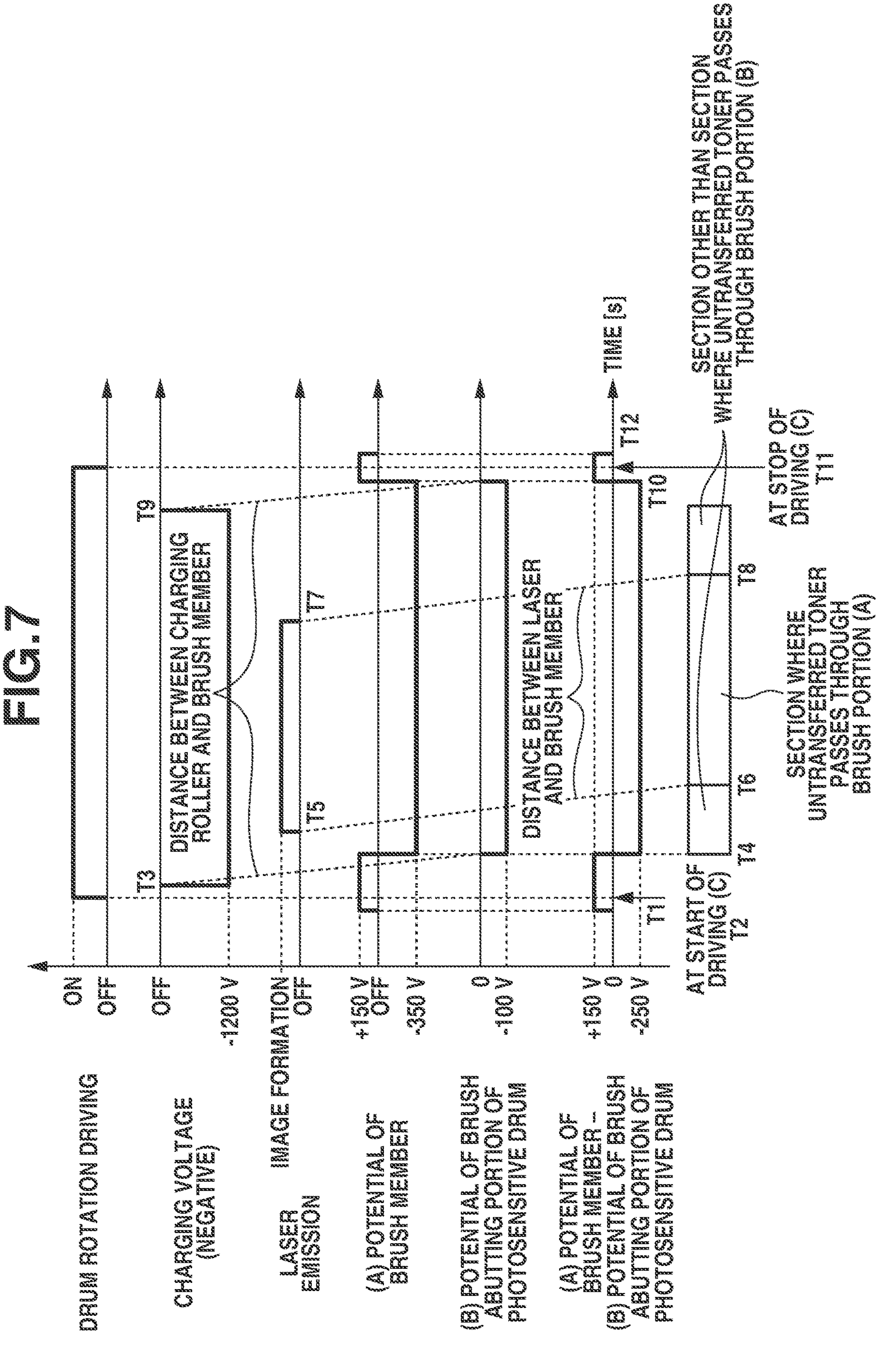
FIG. 7 is a timing chart when a photosensitive drum is started up and when operation is shifted from image forming operation to operation to stop the photosensitive drum according to the first exemplary embodiment.

FIG. 7 is a timing chart of the application voltage from driving start of the photosensitive drum 1 to driving stop of the photosensitive drum 1 through image forming operation in the first exemplary embodiment.

FIG. 7 illustrates, in order from top, ON/OFF of rotational driving of the photosensitive drum 1 by the driving motor 110, the charging voltage applied from the charging power supply E1 to the charging roller 2, and laser emission to the photosensitive drum 1 by the exposure unit 4. FIG. 7 further illustrates time transition of (A) the brush voltage (brush member potential) applied from the brush power supply E4 to the brush member 10, (B) the surface potential of the photosensitive drum 1 at the contact portion, and a difference between the brush voltage and the surface potential of the photosensitive drum 1 at the contact portion ((A)-(B)).

When a print instruction is received before time T1 in FIG. 7, the brush voltage is applied to the brush member 10 at time T1. In the first exemplary embodiment, the brush voltage is set to +150 V. At time T2, rotational driving of the photosensitive drum 1 is started while the brush voltage is applied. Thereafter, the charging voltage of −1200 V is applied to the charging roller 2 to charge the surface of the photosensitive drum 1 at time T3. At time T4 when the surface of the photosensitive drum 1 charged at time T3 reaches the contact portion, the brush voltage is switched from +150 V to −350 V. The potential difference between the potential of the brush member 10 and the surface potential of the photosensitive drum 1 formed at the contact portion is equal to the brush voltage until time T4. Thus, ejection of the toner from the brush member 10 can be controlled by switching of the brush voltage. In the first exemplary embodiment, operation to promote ejection of the negative polarity toner adhering on the brush member 10 is performed until time T4. After time T4, the brush voltage of −350 V is applied to the brush member 10 until time T10 when the image formation ends. During the period, a transfer bias is applied and the normal polarity toner reaches the contact portion as the transfer-residual toner. Thus, the brush voltage is controlled to the negative polarity to allow the transfer-residual toner to pass through the contact portion. At time T5, image formation is started, and exposure for image formation is suitably performed. At time T6 when the surface of the photosensitive drum 1 exposed at time T5 reaches the contact portion, the transfer-residual toner substantially reaches the contact portion. At the time, the brush voltage of the negative polarity is already applied to the brush member 10 as described above, it is thereby possible to allow the transfer-residual toner to pass through the contact portion. Thereafter, the image formation ends at time T7. At time T8 when the surface of the photosensitive drum 1 exposed at time T7 reaches the contact portion, the transfer-residual toner does not substantially reach the contact portion. The image formation ends at time T8, and therefore post-rotation operation after the image formation is performed after time T8. At time T9, the charging voltage is turned off. At time T10 when the surface of the photosensitive drum 1 where the charging voltage is turned off at time T9 reaches the contact portion, the brush voltage is switched from −350 V to +150 V. Thereafter, the driving motor 110 is turned off at time T11. At this time, the potential difference of positive polarity is formed between the potential of the brush member 10 and the surface potential of the photosensitive drum 1 at the contact portion, in the state where the brush voltage of +150 V is applied. The reverse polarity toner can be actively ejected from the brush member 10 by the rotation stop operation of the photosensitive drum 1 and the effect by the above-described potential difference, accordingly. At time T12, the brush voltage is tuned off.

Since the surface potential of the photosensitive drum 1 is not formed at the contact portion until time T3, adjustment of the surface potential of the photosensitive drum 1 is unnecessary. During a period from time T3 to time T12, the pre-exposure device, the transfer bias, and the like may be controlled to adjust the surface potential of the photosensitive drum 1.

Table 2 illustrates a determination result of the toner ejection from the brush member 10 to the surface of the photosensitive drum 1 in the first comparative example, the second comparative example, and the first exemplary embodiment.

TABLE 2

| | During Image Formation | | During Non-Image Formation | | At Start/Stop of Driving | | |
|---|---|---|---|---|---|---|---|
| | Brush Voltage (V) | Surface Potential of Photosensitive Drum after Transfer (V) | Brush Voltage (V) | Surface Potential of Photosensitive Drum after Transfer (V) | Brush Voltage (V) | Surface Potential of Photosensitive Drum after Transfer (V) | Occurrence of Defective Image |
| First Comparative Example | −350 | −100 | −350 | −100 | −350 | 0 | NG |
| Second Comparative Example | −350 | −100 | +150 | −100 | −350 | 0 | NG |
| First Exemplary Embodiment | −350 | −100 | +150 | −100 | +150 | 0 | OK |

As illustrated in Table 2, in the first comparative example, ejection of the reverse polarity toner from the brush member

10 to the surface of the photosensitive drum 1 was performed only when the posture was changed at start and stop of driving, and density of the ejection portion was 10. The result indicates that a small amount of reverse polarity toner was ejected even without considering electric influence when the posture was changed at start and stop of driving. However, in the first comparative example, the toner was sufficiently accumulated on the brush member 10 in a 125th sheet, and a defective image occurred.

In the second comparative example, ejection of the reverse polarity toner from the brush member 10 to the surface of the photosensitive drum 1 is performed when the posture is changed at start and stop of driving, as in the first comparative example. In addition, to eject the reverse polarity toner, reverse of the potential difference between the photosensitive drum 1 and the brush member 10 during the non-image formation (excluding start and stop of driving) is used. Density of the ejection portion in the ejection by the posture change was 10, as in the first comparative example. Further, density of the ejection portion in the section using the potential difference was 22. As compared with the ejection only by the posture change, a large amount of reverse polarity toner was ejected, but a defective image occurred in a 256th sheet. Thus, it was determined as NG. When the section where the ejection is performed by using the potential difference is made long, namely, when the non-image formation is performed for a long time, the ejection amount from the brush member 10 increases, but a rotation time of the photosensitive drum 1 during the non-image formation increases, which deteriorates productivity.

In contrast, in the first exemplary embodiment, to eject the reverse polarity toner from the brush member 10, the potential difference and the posture change at start and stop of driving are used, in addition to the condition of the second comparative example. A total value of density in the ejection using the potential difference in addition to the posture change at start and stop of driving was 55. A defective image did not occur after 500 sheets passed. It was thus determined as OK.

The results obtained from Table 2 are summarized as follows. It is known from the results of the first comparative example and the second comparative example that, to eject the toner from the brush member 10, using the method of reversing the potential difference between the brush member 10 and the photosensitive drum 1 is effective. However, ejection performance in the second comparative example is insufficient if the second comparative example and the first exemplary embodiment are compared. The toner ejected from the brush member 10 by using the potential difference is the toner adhering to bristle tips of the brush near the photosensitive drum 1, of the toner accumulating on the brush member 10, and the potential difference hardly influences on the toner accumulating in an area close to the root part far from the photosensitive drum 1. In contrast, in the case only of the toner ejection by the posture change, the toner accumulating in the area far from the photosensitive drum 1 also moves; however, the toner ejection amount is small because the potential difference moving from the toner to the photosensitive drum 1 is not formed. Therefore, as in the first exemplary embodiment, it is possible to effectively eject the toner when the potential difference for ejecting the accumulating toner is formed while the toner adhering to the brush member 10 is wholly moved by using the posture change of the brush member 10.

As described above, the configuration according to the first exemplary embodiment includes the following components. An image forming apparatus 100 that performs an image forming operation to form an image on a recording medium S, includes a rotatable photosensitive drum 1, a charging roller 2 configured to charge a surface of the photosensitive drum 1 at a charging portion where the charging roller 2 faces the photosensitive drum 1. The image forming apparatus 100 includes an exposure unit 4 configured to expose the surface of the photosensitive drum 1 charged by the charging roller 2, to form an electrostatic latent image on the surface of the photosensitive drum 1. The image forming apparatus 100 includes a developing roller 31 configured to develop the electrostatic latent image as the developer image by supplying the developer charged to a normal polarity to the surface of the photosensitive drum 1, and a transfer roller 5 configured to form a transfer portion by coming into contact with the photosensitive drum 1, and to transfer a developer image from the photosensitive drum 1 to the recording medium S at the transfer portion. The image forming apparatus 100 includes a brush member 10 configured to form the contact portion on the downstream side of the transfer portion and on the upstream side of the charging portion in the rotation direction of the photosensitive drum 1, and to come into contact with the photosensitive drum 1 at the contact portion, and a brush voltage application unit (brush power supply) E4 configured to apply the brush voltage to the brush member 10. The image forming apparatus 100 includes a driving motor 110 configured to rotationally drive the photosensitive drum 1, and a control unit 150 configured to control the brush power supply E4 and the driving motor 110. After the developer image formed on the surface of the photosensitive drum 1 is transferred to the recording medium S at the transfer portion, the developer remaining on the surface of the photosensitive drum 1 is collected by the developing roller 31. The control unit 150 controls a direction of an electric field generated in a first area of the photosensitive drum 1 forming the transfer portion during the image forming operation, in the following manner, at the timing when the first area passes through the contact portion. The direction of the electric field generated in the first area is different from a direction of an electric field generated in a second area of the photosensitive drum 1 forming the contact portion at a timing when operation is shifted from first operation in which the photosensitive drum 1 is rotated at a first speed to second operation in which the photosensitive drum 1 is rotated at a second speed, during non-image forming operation. At this time, the control unit 150 may rotate the photosensitive drum 1 at the first speed during the image forming operation and stop the photosensitive drum 1 at the second speed, or may rotate the photosensitive drum 1 at the second speed during the image forming operation after starting to rotate the photosensitive drum 1 at the first speed. Further, it is desirable to realize the above-described relationship of the potential difference between the brush member 10 and the photosensitive drum 1 even after the photosensitive drum 1 is stopped. It is desirable to realize the above-described relationship of the potential difference between the brush member 10 and the photosensitive drum 1 before the photosensitive drum 1 is driven.

In the first exemplary embodiment, the control unit 150 preferably performs the control in the following manner at the timing when the first area of the photosensitive drum 1 forming the transfer portion during the image forming operation passes through the contact portion. The control unit 150 performs the control to cause the electric field generated in the first area relative to the brush voltage applied to the brush member 10 to be directed in a direction in which the developer charged to the normal polarity moves from the brush member 10 to the surface of the photosensitive drum 1.

In the above-described configuration, performing control to efficiently eject the toner adhering to the brush member 10 abutting on the photosensitive drum 1 makes it possible to prevent a defective image.

In the first exemplary embodiment, the potential difference in the section where the transfer-residual toner passes though the contact portion is reversed from the potential difference at start and stop of driving; however, the timing when the potential difference is reversed is not limited to the time when the driving is started or stopped. For example, the posture change of the brush member 10 occurs when the speed between the photosensitive drum 1 and the brush member 10 is varied, and therefore the potential relationship between the photosensitive drum 1 and the brush member 10 may be reversed at the time when the speed is varied. For example, in a case where the speed is reduced from a speed (1/1 speed) in a normal image formation mode to a speed in a low speed mode (1/2 speed) such as a thick sheet printing mode or vice versa, the ejection operation according to the first exemplary embodiment may be adopted. In the first exemplary embodiment, the brush member 10 is used as the collection member mainly collecting the paper dust; however, the brush member 10 may function as a collection member that temporarily collects the toner and ejects the toner to the surface of the photosensitive drum 1 at a certain timing.

A second exemplary embodiment of the present disclosure will now be described. A basic configuration and operation of an image forming apparatus according to the second exemplary embodiment are substantially the same as the configuration and operation according to the first exemplary embodiment. Thus, elements having the functions and configurations same as or equivalent to the elements in the image forming apparatus according to the first exemplary embodiment are denoted by the same reference numerals, and detailed descriptions of the elements are omitted.

Figure 8:
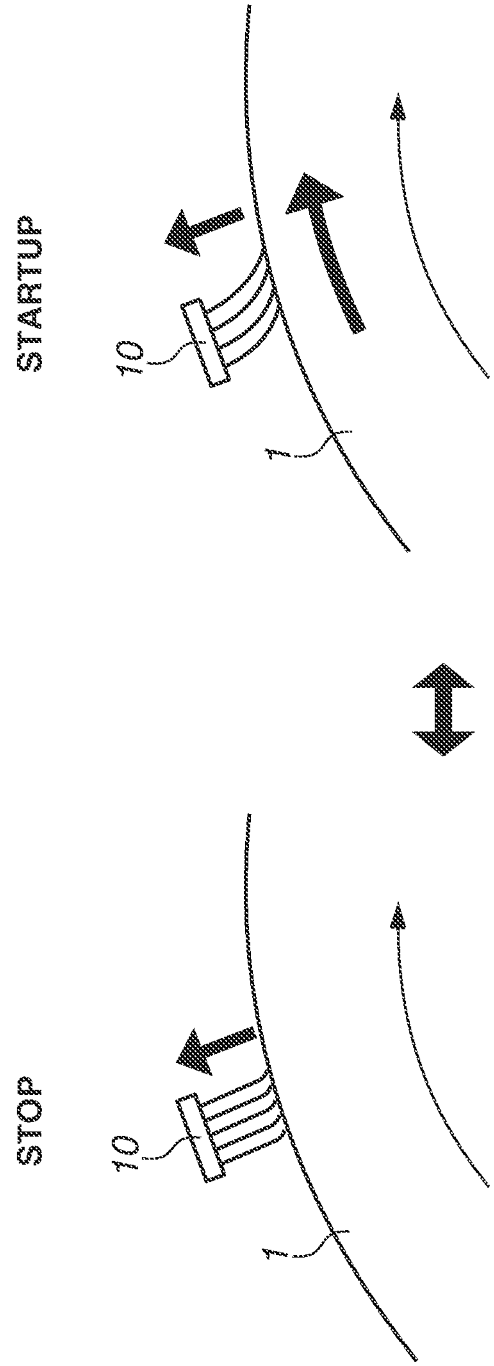
FIG. 8 is a schematic cross-sectional view of a brush member and a photosensitive drum at execution of control according to a second exemplary embodiment.

In the first exemplary embodiment, the configuration using the driving start operation and the driving stop operation accompanying with the common printing operation is described. In the second exemplary embodiment, the driving start operation and the driving stop operation are repeated as illustrated in FIG. 8 under the potential relationship where the reverse polarity toner is ejected from the brush member 10 to the photosensitive drum 1. In the first exemplary embodiment, ejection at start of driving and ejection at stop of driving are each performed once with respect to one printing operation, whereas in the second exemplary embodiment, ejection operation is performable a plurality of times. Thus, the ejection amount by one printing operation can be increased. Effects can be achieved by moving the photosensitive drum 1 by the length substantially equal to the transverse length of the brush member 10 at a time, in consideration of the transverse length of the brush member 10. More specifically, in the second exemplary embodiment, the transverse length L3 of the brush member 10 is 5 mm. The moving distance of the surface of the photosensitive drum 1 moved at a time is therefore set to 5 mm. The moving distance is preferably about 1 mm to about 8 mm. Further, it is necessary to move the photosensitive drum 1 by the number of times enough to achieve the effect of scattering the toner in the brush member 10.

When the photosensitive drum 1 is moved five times, it is possible to effectively eject the toner from the brush member 10. In the second exemplary embodiment, the photosensitive drum 1 is moved five times while the photosensitive drum 1 is stopped in the post-rotation operation during the non-image formation. Further, when the recording medium S is jammed, the photosensitive drum 1 is moved ten times because a large amount of toner adheres to the brush member 10.

As described above, in the second exemplary embodiment, performing control to more efficiently eject the toner adhering to the brush member 10 abutting on the photosensitive drum 1 makes it possible to prevent a defective image.

A third exemplary embodiment of the present disclosure will now be described. A basic configuration and operation of an image forming apparatus according to the third exemplary embodiment are substantially the same as the configuration and operation according to each of the first and second exemplary embodiments. Elements having the functions and configurations same as or equivalent to the elements in the image forming apparatus according to the first and second exemplary embodiments are therefore denoted by the same reference numerals, and detailed descriptions of the elements are omitted.

Figure 9:
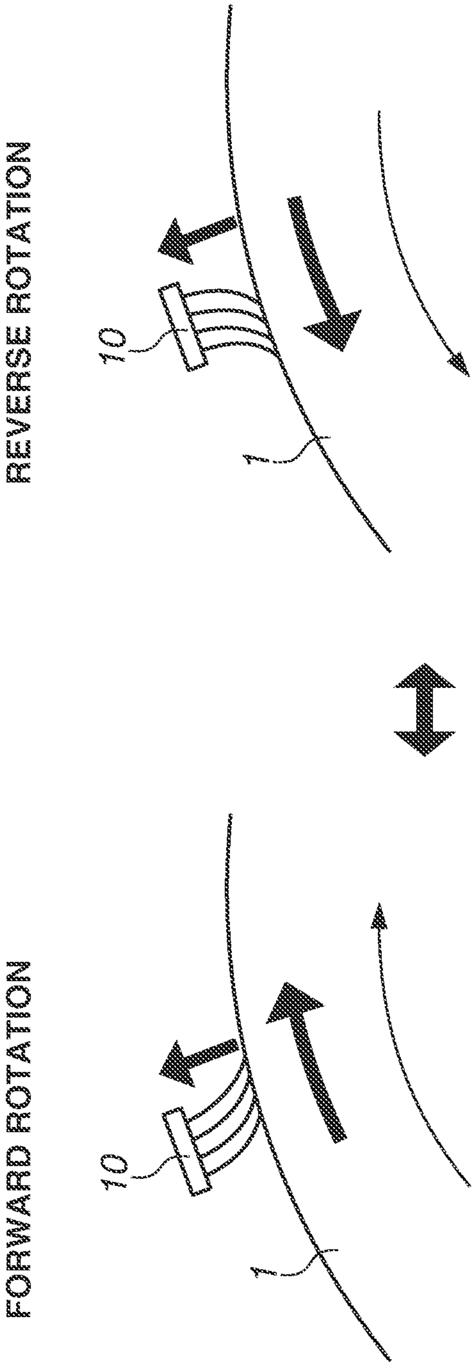
FIG. 9 is a schematic cross-sectional view of a brush member and a photosensitive drum at execution of control according to a third exemplary embodiment.

In the first and second exemplary embodiments, the configuration using the driving start operation and the driving stop operation accompanying with the common printing operation is described. In the third exemplary embodiment, forward rotation operation same as in the printing operation and reverse rotation operation are performed as illustrated in FIG. 9 under the potential relationship where the reverse polarity toner is ejected from the brush member 10 to the photosensitive drum 1. In the first and second exemplary embodiments, ejection is performed by driving and stop of the forward rotation, whereas in the third exemplary embodiment, driving and stop of the reverse rotation are performed in addition to the forward rotation. Thus, posture change of the brush member 10 in the reverse direction can also be used. This makes it possible to increase the toner ejection amount. In the third exemplary embodiment, the forward rotation operation of the photosensitive drum 1 and the reverse rotation operation of the photosensitive drum 1 are alternately performed to enhance the effect of ejecting the toner from the brush member 10. More specifically, after the forward rotation of the photosensitive drum 1 is performed, the reverse rotation is performed, and the forward rotation is performed again. The number of times of forward rotation and the number of times of reverse rotation are each suitably settable, but are each preferably set to two times. Further, the moving distance in the second rotation is made smaller than the moving distance in the first rotation, which makes it possible to achieve large toner ejection effect. In other words, maximizing the moving distance in the first rotation makes it possible to increase the ejection amount. The toner ejected in the post-rotation operation slips through the contact portion at the next startup of the photosensitive drum 1. The toner can therefore be more efficiently ejected.

As described above, in the third exemplary embodiment, performing control to more efficiently eject the toner adhering to the brush member 10 abutting on the photosensitive drum 1 makes it possible to prevent a defective image.

Performing the control to efficiently eject the toner adhering to the brush member abutting on the photosensitive drum makes it possible to prevent a defective image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus for performing image forming operation to form an image on a transfer-receiving member, the image forming apparatus comprising:

a rotatable photosensitive member;

a charging member configured to charge a surface of the rotatable photosensitive member at a charging portion where the charging member faces the rotatable photosensitive member;

an exposure unit configured to expose the surface of the rotatable photosensitive member charged by the charging member, to form an electrostatic latent image on the surface of the rotatable photosensitive member;

a developing member configured to develop the electrostatic latent image as a developer image by supplying a developer charged to normal polarity to the surface of the rotatable photosensitive member;

a transfer member configured to form a transfer portion by coming into contact with the rotatable photosensitive member, and to transfer the developer image from the rotatable photosensitive member to the transfer-receiving member at the transfer portion;

a brush configured to form a contact portion on a downstream side of the transfer portion and on an upstream side of the charging portion in a rotation direction of the rotatable photosensitive member, and to come into contact with the rotatable photosensitive member at the contact portion;

a voltage application unit configured to apply a voltage to the brush;

a driving unit configured to rotationally drive the rotatable photosensitive member; and a control unit configured to control the voltage application unit and the driving unit, wherein, after the developer image formed on the surface of the rotatable photosensitive member is transferred to the transfer-receiving member at the transfer portion, developer remaining on the surface of the rotatable photosensitive member is collected by the developing member, wherein the control unit is configured to perform control of the image forming operation and a non-image forming operation which is different from the image forming operation, wherein, in a case of performing control, the control unit performs control to the voltage application unit such that a polarity of a first voltage applied to the brush when a first region of the rotatable photosensitive member forming the transfer portion passes through the contact portion during the image forming operation is different from a polarity of a second voltage applied to the brush when a second region of the rotatable photosensitive member forming the transfer portion passes through the contact portion while operation is shifted from a first operation in which the rotatable photosensitive member is rotated at a first speed to a second operation in which the rotatable photosensitive member is rotated at a second speed different from the first speed during the non-image forming operation, and wherein, relative to a posture of the brush during the second operation, the brush takes a posture during the first operation of falling toward downstream in the rotation direction of the rotatable photosensitive member.

2. The image forming apparatus according to claim 1, wherein the control unit is configured to perform control to make a direction of an electric field generated in a first area of the rotatable photosensitive member forming the transfer portion during the image forming operation, relative to the voltage applied to the brush in a state where the first area passes through the contact portion, different from a direction of an electric field generated in a second area of the rotatable photosensitive member forming the contact portion, relative to the voltage applied to the brush when operation is shifted from the first operation in which the rotatable photosensitive member is rotated at the first speed to the second operation in which the rotatable photosensitive member is rotated at the second speed different from the first speed, during the non-image forming operation.

3. The image forming apparatus according to claim 1, wherein the control unit is configured to perform control to make the second speed lower than the first speed.

4. The image forming apparatus according to claim 3, wherein, during the image forming operation, the control unit performs control to rotate the rotatable photosensitive member at the first speed.

5. The image forming apparatus according to claim 1, wherein the control unit is configured to perform control to make the second speed higher than the first speed.

6. The image forming apparatus according to claim 5, wherein, during the image forming operation, the control unit performs control to rotate the rotatable photosensitive member at the second speed.

7. The image forming apparatus according to claim 1, wherein the control unit is configured to perform control to cause, in a state where a first area of the rotatable photosensitive member forming the transfer portion passes through the contact portion during the image forming operation, an electric field generated in the first area relative to the voltage applied to the brush to be directed in a direction in which the developer charged to the normal polarity moves from the brush to the surface of the rotatable photosensitive member.

8. The image forming apparatus according to claim 1, wherein a section where the operation is shifted from the first operation to the second operation is a section where a shiftable state is shifted from a first state where rotation of the rotatable photosensitive member is stopped to a second state where the rotatable photosensitive member is driven, or is a section where the shiftable state is shifted from the second state to the first state.

9. The image forming apparatus according to claim 1, wherein the control unit is configured to perform control to cause the rotation direction of the rotatable photosensitive member rotated at the first speed to be reversed from the rotation direction of the rotatable photosensitive member rotated at the second speed.

10. The image forming apparatus according to claim 1, wherein the developer charged to the normal polarity is a one-component developer.

11. The image forming apparatus according to claim 1, wherein, to charge the surface of the rotatable photosensitive member, the charging member comes into contact with the surface of the rotatable photosensitive member.

12. The image forming apparatus according to claim 1, wherein the brush has a base fabric and a yarn portion including a plurality of yarns extending from the base fabric, and a density of the plurality of yarns of the brush is 150 to 350 $kF/inch^2$.

* * * * *